United States Patent [19]

Hollingshead

[11] 4,071,565

[45] Jan. 31, 1978

[54] BUTYLATED, α-METHYL STYRENATED PHENOLIC ANTIOXIDANTS

[75] Inventor: William S. Hollingshead, Cuyahoga Falls, Ohio

[73] Assignee: The Goodyear Tire & Rubber Company, Akron, Ohio

[21] Appl. No.: 660,078

[22] Filed: Feb. 23, 1976

Related U.S. Application Data

[62] Division of Ser. No. 542,333, Jan. 20, 1975, Pat. No. 3,989,665.

[51] Int. Cl.$^2$ ............................................. C07C 39/12
[52] U.S. Cl. ........................... 260/619 R; 260/45.95 H
[58] Field of Search ...................... 260/619 R, 45.95 H

[56] References Cited

U.S. PATENT DOCUMENTS

| | | | |
|---|---|---|---|
| 2,276,117 | 3/1942 | Taylor et al. | 260/619 R |
| 2,388,583 | 11/1945 | Ward | 260/619 R |
| 2,394,754 | 2/1946 | D'Alelio | 260/619 R |
| 2,909,504 | 10/1959 | Spacht | 260/619 R |
| 3,048,563 | 8/1962 | Seydel et al. | 260/619 R |
| 3,183,273 | 5/1965 | Spacht | 260/619 R |
| 3,290,392 | 12/1966 | Ecke et al. | 260/619 R |

*Primary Examiner*—Norman Morgenstern
*Attorney, Agent, or Firm*—F. W. Brunner; J. A. Rozmajzl

[57] ABSTRACT

Phenol is reacted with α-methyl styrene and isobutylene to produce a mixture of substituted phenols which have excellent color characteristics and exhibit unusual and unexpected antioxidant activity.

2 Claims, No Drawings

BUTYLATED, α-METHYL STYRENATED PHENOLIC ANTIOXIDANTS

This is a division of application Ser. No. 542,333, filed Jan. 20, 1975, and now issued as U.S. Pat. No. 3,989,665.

This invention relates to butylated, α-methyl styrenated phenols and their use as antioxidants. More particularly it relates to combinations of substituted phenols which are used as antioxidants.

The alkylation of various simple phenolic compounds such as phenol itself and the various cresols with compounds containing mono-olefinic unsaturation such as isobutylene, styrene and α-methyl styrene is well known in the art. In this respect see such references as "Comparison of Antioxidant Activity of Various Butylated Aralkylated Cresols" by Spacht et al in Industrial and Engineering Chemistry, Vol. 1, No. 3, September 1962, beginning on page 202; and U.S. Patents such as U.S. Pat. Nos. 3,183,273; 3,035,015; 3,265,742; 3,062,761; 2,967,853; 2,909,504 and 2,945,001. While the compounds described by these references do offer antioxidant activity, the search for even better antioxidant systems continues.

It is an object of the present invention to provide an antioxidant which possesses effective antioxidant activity and good color characteristics. Other objects of the present invention will become apparent as the description proceeds.

The objects of the present invention are accomplished by reacting the phenol, isobutylene and α-methyl styrene (AMS) to produce a multi-component reaction product possessing good antioxidant activity and good color characteristics.

The reaction product is prepared according to conventional alkylation procedures used in the preparation of alkylated phenols. The following can be considered as guidelines to be used in the preparation of these compositions.

The molar ratio of the three reactants, i.e., the phenol, the AMS and the isobutylene, is from 1/0.5/0.5 to 1/2.5/2.5 with the proviso that the total amount of AMS plus isobutylene is 2.5 to 3.5 moles per mole of phenol. Preferably the amount of AMS charged is from 1.5 to 2.5 moles. Preferably the amount of isobutene charged is from 0.5 to 1.5 moles. The AMS is always reacted with the phenol before the addition of the isobutylene. The reaction temperature is normally in the range of 60° C. to 140° C. A Friedel-Crafts catalyst is used to catalyze the reaction. Friedel-Crafts catalysts and reactions are discussed in volume 1 of Friedel-Crafts and Related Reactions edited by George A. Olah, 1963, Interscience Publications, pages 25–91, and in Encyclopedia of Chemistry, 3rd. edition, Van Nostraand Reinhold Company, pages 470–471. These catalysts are illustrated by metal halides, aluminum chloride, aluminum bromide, aluminum iodide, ferric chloride, zinc chloride, zirconium chloride, boron fluorides (such as boron trifluoride and complexes thereof), acids such as sulfuric acid, aromatic sulfuric acids, phosphoric acid and hydrogen fluoride. Supported phosphoric acid, silica alumina and cation exchange resins are also included herein as Friedel-Crafts catalysts. Although no solvent is necessary, standard inert organic solvents such as toluene or benzene can be used if desired. The amount of Friedel-Crafts catalyst used is normally from 2 to 12 parts by weight per 100 parts by weight of phenol, although amounts as high as 40 parts can be used. Once the reaction with the AMS and isobutylene is complete, the system is neutralized, for example with lime or sodium carbonate. The combination is then heated under vacuum to remove the volatiles and is filtered.

The above reaction results in a mixture of phenolic antioxidants, i.e., 4-(dimethylbenzyl)-phenol; 2,4-di(-dimethylbenzyl)-phenol and 2,4-di(dimethylbenzyl-6-tert.butylphenol along with other compounds. Attempts to prepare these three major components separately and then combine them have resulted in combinations with antioxidant activity inferior to that obtained by preparing the combination in situ. Possibly this is due to the presence of additional compounds which, although present in smaller amounts, do help to benefit antioxidant activity.

When styrene is substituted for the AMS or p-cresol is substituted for the phenol, the antioxidant effectiveness of the product is reduced. In other words, the use of AMS instead of styrene and phenol instead of p-cresol in the preparation of substituted phenols results in an improvement in antioxidant activity.

The compositions of the present invention can be used to protect any material subject to oxidative degradation against said degradation. This includes natural rubbers and synthetic rubbers, for example, butadiene/styrene copolymers, butadiene/acrylonitrile copolymers, cis-1,4 polybutadiene, cis-1,4 polyisoprene and ethylene propylene terpolymers. Said compositions may also be used to stabilize non-rubbers such as polystyrene, polypropylene and polyethylene. They can be used with other anti-oxidants and polymer additives and can be added to the polymers by any method.

The following examples illustrate but do not limit the practice of the present invention.

EXAMPLE 1

Ninety-four grams of phenol and 4 grams of toluene sulfonic acid are heated to 90° C. 236 Grams of α-methyl styrene is added over a 1-hour period maintaining the temperature between 90° C. and 95° C. The isobutene is then added over a one-hour period at 90° C. to 95° C. The reaction mixture is neutralized with 6 grams of anhydrous $Na_2CO_3$ and held with stirring at 90° C. to 95° C. for 30 minutes at which time it is heated to 175° C. at 15 millimeters of mercury to remove the volatiles, and filtered.

EXAMPLE 2

Ninety-four grams of phenol, 4 grams of toluene sulfonic acid, 118 grams of α-methyl styrene and 112 grams of isobutene are reacted according to the process described in Example 1.

Various reaction products were prepared using a Friedel-Crafts catalyst, at a temperature of about 90° C., using the following molar ratios of reactants. A butadiene/styrene copolymer (SBR) was compounded with 1.0 part by weight of each of the products per 100 parts by weight of SBR and oxygen absorption data obtained. Samples 4 and 6 are products of the present invention.

| Sample | Reactants | Molar Ratio | Hours to 1.0% $O_2$ at 100° C. |
|---|---|---|---|
| 1 | Phenol/Styrene | 1:2 | 126 |
| 2 | Phenol/α-Methyl Styrene | 1:2 | 103 |
| 3 | Phenol/Styrene/Isobutene | 1:2:1 | 160 |
| 4 | Phenol/α-Methyl Styrene/Isobutene | 1:2:1 | 261 |
| 5 | Phenol/Styrene/Isobutene | 1:1:2 | 269 |

| Sample | Reactants | Molor Ratio | Hours to 1.0% O$_2$ at 100° C. |
|---|---|---|---|
| 6 | Phenol/α-Methyl Styrene/ Isobutene | 1:1:2 | 325 |

The reaction product of phenol and styrene (Sample 1) provided an oxygen absorption value of 126 hours. When AMS was substituted for the styrene (Sample 2) a lesser value of 103 hours was obtained. However, when the same reactions were followed by alkylation with isobutene, the AMS product (Sample 4) provided antioxidant protection over 60 percent greater than that offered by a similar product where styrene was used instead of AMS (Sample 3). When the molar ratio was charged to 1:1:2, the AMS product (Sample 6) offered an improvement of over 20 percent over the styrene compound (Sample 5).

The major components of the product of the present invention were tested on two separate occasions (Samples 7, 8 and 9) and compared in SBR with a product of the present invention (Sample 10). The oxygen absorption results are shown below.

| Sample | Reaction Product | Molar Ratio | Hours to 1% O$_2$ at 100° C. |
|---|---|---|---|
| 7 | 4-(dimethylbenzyl)-phenol | — | 118 and 85 |
| 8 | 2,4-di(dimethylbenzyl)-phenol | — | 98 and 148 |
| 9 | 2,4-di(dimethylbenzyl)-6-t-butyl phenol | — | 129 and 155 |
| 10 | phenol/ alpha-methyl styrene/ isobutene | 1:2:1 | 199 and 263 |

In each case Sample 10 was far superior to any of the major components.

The phenolic reaction product of the present invention is used at conventional levels to stabilize oxidizable polymers. It can be used in antioxidant amounts as low as 0.001 part and as high as 10 parts and higher per 100 parts by weight of polymer, although the precise amount will depend somewhat on the nature of the polymer and the severity of the deteriorating conditions to which the polymer is to be exposed, unsaturated polymers normally requiring greater amounts than saturated polymers. Although 0.25 to 10 parts per 100 parts of polymer are effective in diene rubbers, more practical levels are from 0.5 to 2.0 parts.

While certain representative embodiments and details have been shown for the purpose of illustrating the invention, it will be apparent to those skilled in the art that various changes and modifications may be made therein without departing from the spirit or scope of the invention.

I claim:

1. A phenolic reaction product prepared by a two-step reaction comprising
    a. reacting a combination comprising phenol and α-methyl styrene in the presence of a Friedel-Crafts catalyst, and
    b. subsequently reacting the phenol/α-methyl styrene reaction product with isobutene in the presence of a Friedel-Crafts catalyst, wherein the phenol/α-methyl styrene/isobutene molar ratio is from 1:0.5:0.5 to 1:2.5:2.5 and wherein the total molar amount of α-methyl styrene plus isobutene charged is from 2.5 to 3.5 moles per mole of phenol.

2. The product according to claim 1 wherein the amount of α-methyl styrene is from 1.5 to 2.5 moles and the amount of isobutene is from 0.5 to 1.5 moles, all moles per mole of phenol, and wherein the reaction temperature is from 60° C. to 140° C.

UNITED STATES PATENT AND TRADEMARK OFFICE
CERTIFICATE OF CORRECTION

PATENT NO. : U.S. 4,071,565
DATED : Jan. 31, 1978
INVENTOR(S) : William S. Hollingshead It is certified that error appears in the above-identified patent and that said Letters Patent are hereby corrected as shown below:

In column 1, Line 60 - "sulfuric" should be --sulfonic--.

*Signed and Sealed this*

*Seventh* Day of *August 1979*

[SEAL]

Attest:

Attesting Officer

LUTRELLE F. PARKER
*Acting Commissioner of Patents and Trademarks*